(No Model.)
C. F. BAKER.
PROCESS OF FILTERING OIL.
No. 420,428. Patented Feb. 4, 1890.
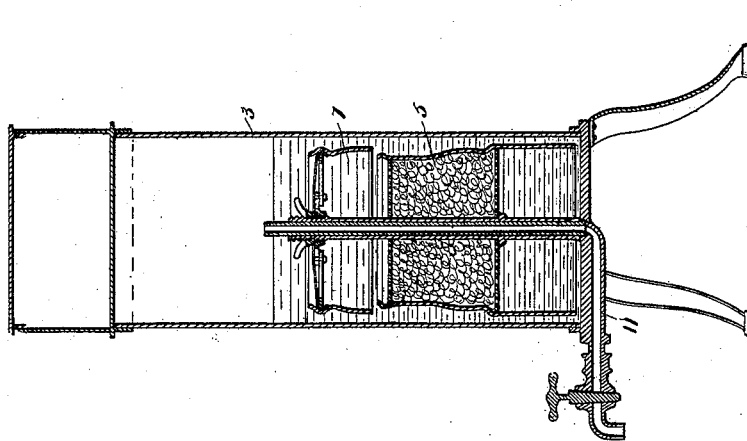
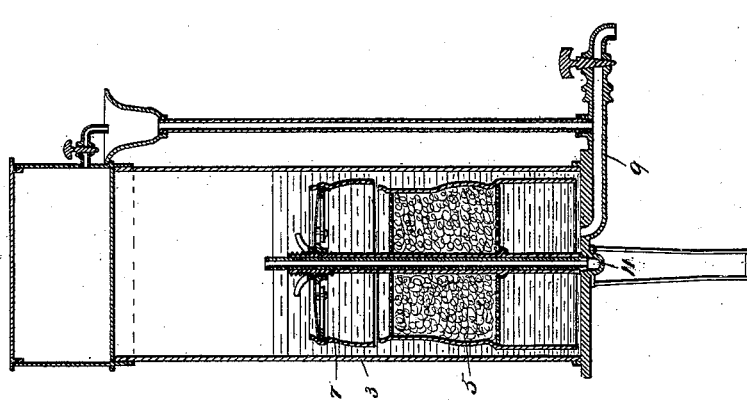
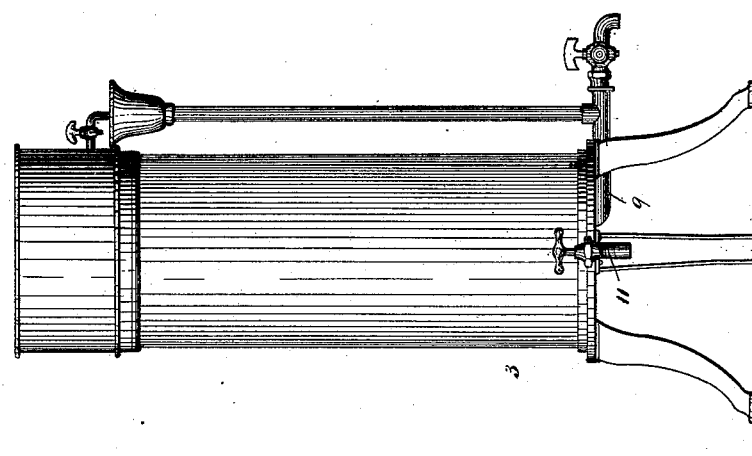
Witnesses.
J. Jessen.
C. Nachtrieb.
Inventor.
Charles F. Baker
By Paul, Sanford + Merwin Atty's

UNITED STATES PATENT OFFICE.

CHARLES F. BAKER, OF MINNEAPOLIS, MINNESOTA.

PROCESS OF FILTERING OIL.

SPECIFICATION forming part of Letters Patent No. 420,428, dated February 4, 1890.

Application filed May 18, 1888. Serial No. 274,320. (No specimens.)

*To all whom it may concern:*

Be it known that I, CHARLES F. BAKER, of Minneapolis, in the county of Hennepin, State of Minnesota, have invented a new and useful Process of Filtering Oil, of which the following is a specification.

My invention relates to improvements in the process of filtering oil, and is especially adapted for cleaning waste oil that has been used for lubricating purposes and has been caught as it escaped from the journal or other bearings.

The invention consists, generally, in the process hereinafter described, and pointed out in the claim.

In the accompanying drawings, Figure 1 is a side elevation of an apparatus that is adapted for carrying out my improved process. Fig. 2 is a central vertical section of the same. Fig. 3 is a similar section taken on a plane at right angles to Fig. 2.

I provide a suitable casing or vessel, in which is placed a liquid with which the oil to be filtered will not mix, and which is of greater specific gravity than the oil, so that the oil will rise through it to the top of the liquid. Submerged in this liquid are one or more filtering mediums, through which the oil must pass as it rises to the top of the liquid. These mediums are entirely submerged in the liquid, and the oil passes through them simultaneously with its passing through the liquid, so that the oil is being acted upon by the liquid all of the time that it is passing through the filtering medium. The action of the liquid upon the oil causes it to become thin, and as the liquid extends above the filtering mediums the oil will remain thin till after it has passed through all of the filtering mediums. This thinning of the oil by the action of the liquid upon it has two important results:

First, the specific gravity of the oil becomes less and its drop or globular form is broken up, and in passing through the filtering material all foreign substances will be arrested and held by the filtering material. Substances which were held in suspension by the thick oil will now be readily separated from it.

Second, the thin oil will more readily and evenly pass through the filtering mediums, and as it does not pass out of the liquid until after it has passed through these mediums it must consequently remain thin until it has passed through the filters. In other words, it passes through the filters while being simultaneously acted upon by the liquid.

In the accompanying drawings, 3 represents a suitable casing, which is filled to any desired height with water or other liquid with which oil will not mix, and which is of greater specific gravity than the oil. In this casing I arrange a filter-box 5, preferably filled with wool and sawdust or other suitable filtering material. I may also use in addition another filtering medium 7, arranged over the filter-box, but all submerged in the liquid.

A pipe 9 is provided, through which the oil is conducted beneath the filters, and a pipe 11, by which the purified oil may be withdrawn. As the filtering mediums are entirely submerged in the liquid, the tendency to gum or clog up the filtering material by the oil is removed. Filter-cloths or any filtering material that is exposed to the atmosphere and is used for filtering oil will soon become so gummy that the oil will not pass through it, and even where the filtering mediums are submerged in the oil they will soon become clogged up, and even where it is intended that the filtering mediums shall remain covered with oil they will often become exposed to the atmosphere, owing to the supply of oil running short. With my process, however, as the filtering material is always fully submerged in the liquid, it is kept entirely free from this difficulty. When the filtering medium becomes clogged with the dirt or sediment removed from the oil, it may be readily removed and changed; but it will not become gummy from the passage of the oil through it, and will only need to be renewed when it has become filled up by the dirt removed from the oil.

I am aware that prior to my invention oil has been filtered by being passed first through a liquid of greater specific gravity than the oil, and then passing it through a filtering medium arranged above the liquid; but in this instance the action of the liquid upon the oil ceases before it passes through the filtering medium, and the filtering medium is exposed to the atmosphere, while in my process this action continues until after the oil has passed through the filtering mediums, and the mediums are not exposed.

I claim as my invention—

The process of filtering oil, consisting in first passing the oil through a body of liquid of greater specific gravity than the oil, and then passing it through porous filtering media entirely submerged in such liquid, substantially as set forth.

CHARLES F. BAKER.

Witnesses:
A. C. PAUL,
R. H. SANFORD.